(12) United States Patent
Bergquist et al.

(10) Patent No.: US 10,369,672 B2
(45) Date of Patent: Aug. 6, 2019

(54) OUTDOOR POWER DEVICE INTERNAL COOLING SYSTEM

(71) Applicant: Husqvarna AB, Huskvarna (SE)

(72) Inventors: Oskar Bergquist, Huskvarna (SE); Stefan Steen, Huskvarna (SE)

(73) Assignee: HUSQVARNA AB, Huskarna (SE)

( * ) Notice: Subject to any disclaimer, the term of this patent is extended or adjusted under 35 U.S.C. 154(b) by 669 days.

(21) Appl. No.: 14/436,579

(22) PCT Filed: Oct. 19, 2012

(86) PCT No.: PCT/SE2012/051116
§ 371 (c)(1),
(2) Date: Apr. 17, 2015

(87) PCT Pub. No.: WO2014/062105
PCT Pub. Date: Apr. 24, 2014

(65) Prior Publication Data
US 2015/0336232 A1 Nov. 26, 2015

(51) Int. Cl.
*B23Q 11/00* (2006.01)
*B23Q 11/12* (2006.01)
*B25F 5/00* (2006.01)

(52) U.S. Cl.
CPC ............ *B23Q 11/127* (2013.01); *B25F 5/008* (2013.01)

(58) Field of Classification Search
CPC ..... B23Q 11/12; B23Q 11/126; B23Q 11/127; B25F 5/008
See application file for complete search history.

(56) References Cited

U.S. PATENT DOCUMENTS

| 3,652,879 | A |   | 3/1972  | Plunkett et al. |
|-----------|---|---|---------|-----------------|
| 6,043,575 | A |   | 3/2000  | Ghode et al.    |
| 6,127,751 | A | * | 10/2000 | Kristen ................... B25F 5/008 173/117 |
| 6,543,549 | B1|   | 4/2003  | Riedl et al.    |

(Continued)

FOREIGN PATENT DOCUMENTS

| CN | 201192004 Y    | 2/2009  |
| DE | 4238564 A1     | 5/1994  |
| DE | 202010014781 U1| 12/2010 |
| DE | 102010030376 A1| 12/2011 |
| EP | 1715565 A1     | 10/2006 |

(Continued)

OTHER PUBLICATIONS

International Search Report and Written Opinion for International Application No. PCT/SE2012/051116 dated Jul. 8, 2013.

(Continued)

*Primary Examiner* — Chelsea E Stinson
(74) *Attorney, Agent, or Firm* — Burr Forman McNair

(57) ABSTRACT

An electric power device may include a casing, a motor disposed within the casing, a control unit, and an air channel. The motor may be configured to operate a working implement of the device and may include a motor housing having at least one outlet through which air cooling the motor exits the motor housing. The air channel may be configured to enclose the at least one outlet of the motor housing. The air channel may provide a passage for the air drawn from outside the casing and through the motor housing out of the casing via an exhaust outlet disposed in the casing at an end of the air channel.

18 Claims, 6 Drawing Sheets

(56) References Cited

U.S. PATENT DOCUMENTS

| | | | |
|---|---|---|---|
| 7,359,194 B2 * | 4/2008 | Krauter | B25F 5/008 361/695 |
| 7,597,157 B2 | 10/2009 | Stierle et al. | |
| 2008/0106159 A1 | 5/2008 | Yoshida et al. | |
| 2008/0290745 A1 * | 11/2008 | Riedl | B25F 5/008 310/50 |
| 2009/0145621 A1 * | 6/2009 | Lau | B25F 5/008 173/217 |
| 2009/0245958 A1 * | 10/2009 | Lau | B25F 5/008 408/125 |
| 2010/0218385 A1 * | 9/2010 | Mang | A01G 3/053 30/216 |
| 2010/0244592 A1 | 9/2010 | Oomori et al. | |
| 2011/0154796 A1 | 6/2011 | Onose | |

FOREIGN PATENT DOCUMENTS

| | | |
|---|---|---|
| GB | 658280 A | 10/1951 |
| GB | 2423420 A | 8/2006 |
| JP | H02119547 A | 5/1990 |
| JP | 2004066439 A | 3/2004 |
| JP | 04451262 B2 | 4/2010 |
| WO | 03051574 A1 | 6/2003 |
| WO | 2005039823 A1 | 5/2005 |
| WO | 2011160871 A1 | 12/2011 |
| WO | WO 2011160871 A1 * | 12/2011 ............. B23D 51/00 |

OTHER PUBLICATIONS

International Preliminary Report on Patentability in the International Application No. PCT/SE2012/051116 dated Apr. 21, 2015.

* cited by examiner

OUTDOOR POWER DEVICE INTERNAL COOLING SYSTEM

TECHNICAL FIELD

Example embodiments generally relate to an outdoor power device that is electric powered and, more particularly, relate to an internal cooling system for such an outdoor power device.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

A common requirement for such devices, regardless of the power source, is that some components of the devices will need to be cooled. Electric powered devices typically employ electric components that heat up during powered operation and, for some such devices; air cooling may be employed internal to the device to manage internal temperatures. To employ the air cooling, it is often considered to be necessary to provide vents or louvers for the intake of air for internal circulation prior to exhausting heated air. However, the inclusion of vents for intake of air may be somewhat disadvantageous given that these devices operate in relatively harsh environments. In this regard, for example, the work these devices are employed to perform inherently generates and often stirs up debris. Moreover, the devices are often used in outdoor environments that may include moisture, dirt or other potential contaminants. Thus, large air vents or louvers may provide ample opportunity for unwanted contaminants to reach internal components of the devices.

Accordingly, there is a need for an arrangement providing cooling of internal components of such devices with less risk of introducing unwanted contaminants.

BRIEF SUMMARY OF SOME EXAMPLES

Some example embodiments may therefore provide a cooling system for internal components of outdoor power devices. In this regard, some embodiments may provide for cooling of such devices without a need for relatively large and accessible louvers or vents. Accordingly, some embodiments may provide for the provision of an internal cooling system arrangement that can be used in connection with relatively small or non-obvious air inlets. Some embodiments may therefore employ an air channel disposed within the device to facilitate internal cooling in an efficient manner.

In one example embodiment, an electric power device is provided. The device may include a casing, a motor disposed within the casing, and an air channel. The motor may be configured to operate a working implement of the device and may include a motor housing having at least one outlet through which air cooling the motor exits the motor housing. The air channel may be configured to enclose the at least one outlet of the motor housing. The air channel may provide a passage for the air drawn from outside the casing and through the motor housing out of the casing via an exhaust outlet disposed in the casing at an end of the air channel.

In another example embodiment, a method of cooling an electric power device is provided. The method may include drawing air from outside a casing of the device into the casing and drawing the air into a motor of the device and cooling the motor by passing the air through a motor housing containing the motor to generate motor exhaust air that is heated to a first temperature and exits the motor housing through at least one outlet formed in a body of the motor housing. The method may further include passing the motor exhaust air into an air channel that is disposed to enclose the at least one outlet. The air channel may provide a passage for the air drawn from outside the casing and through the motor housing out of the casing via an exhaust outlet disposed at an end of the air channel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
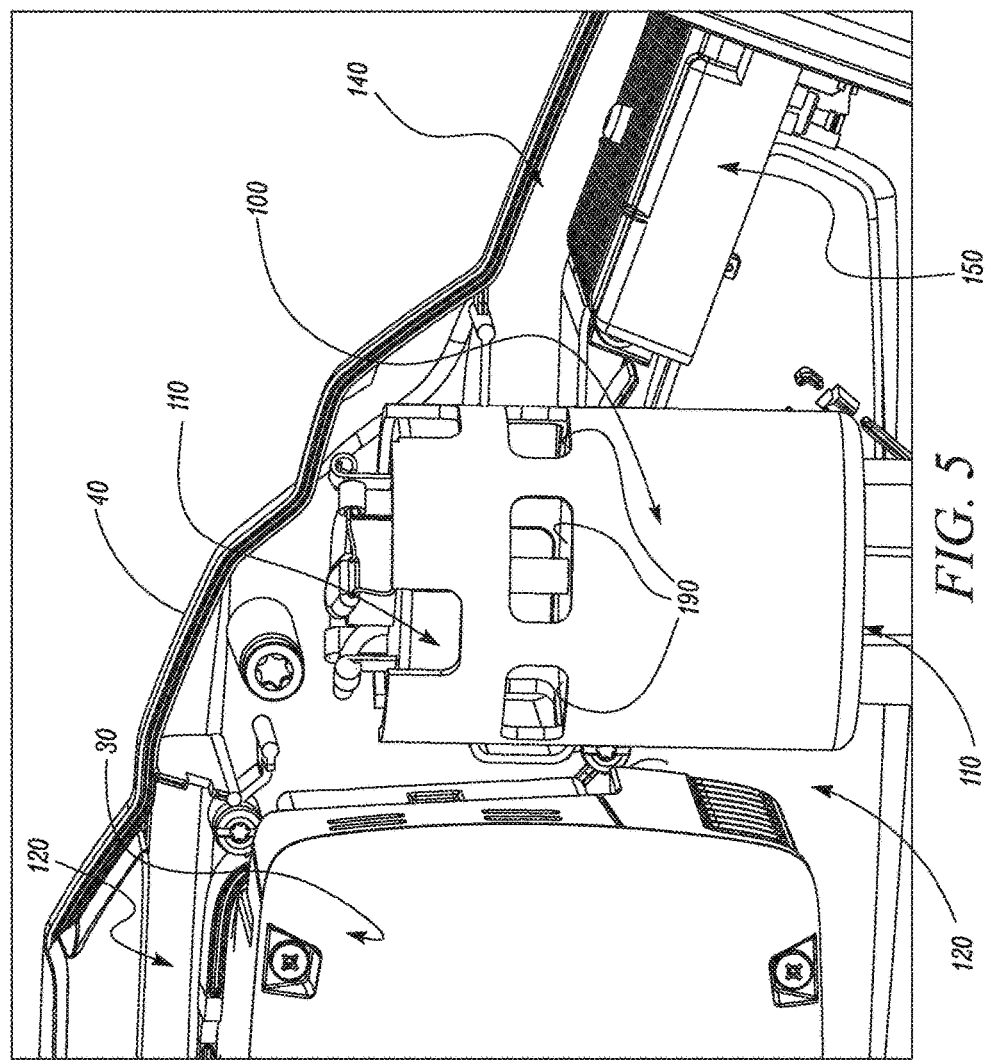
Figure 6:
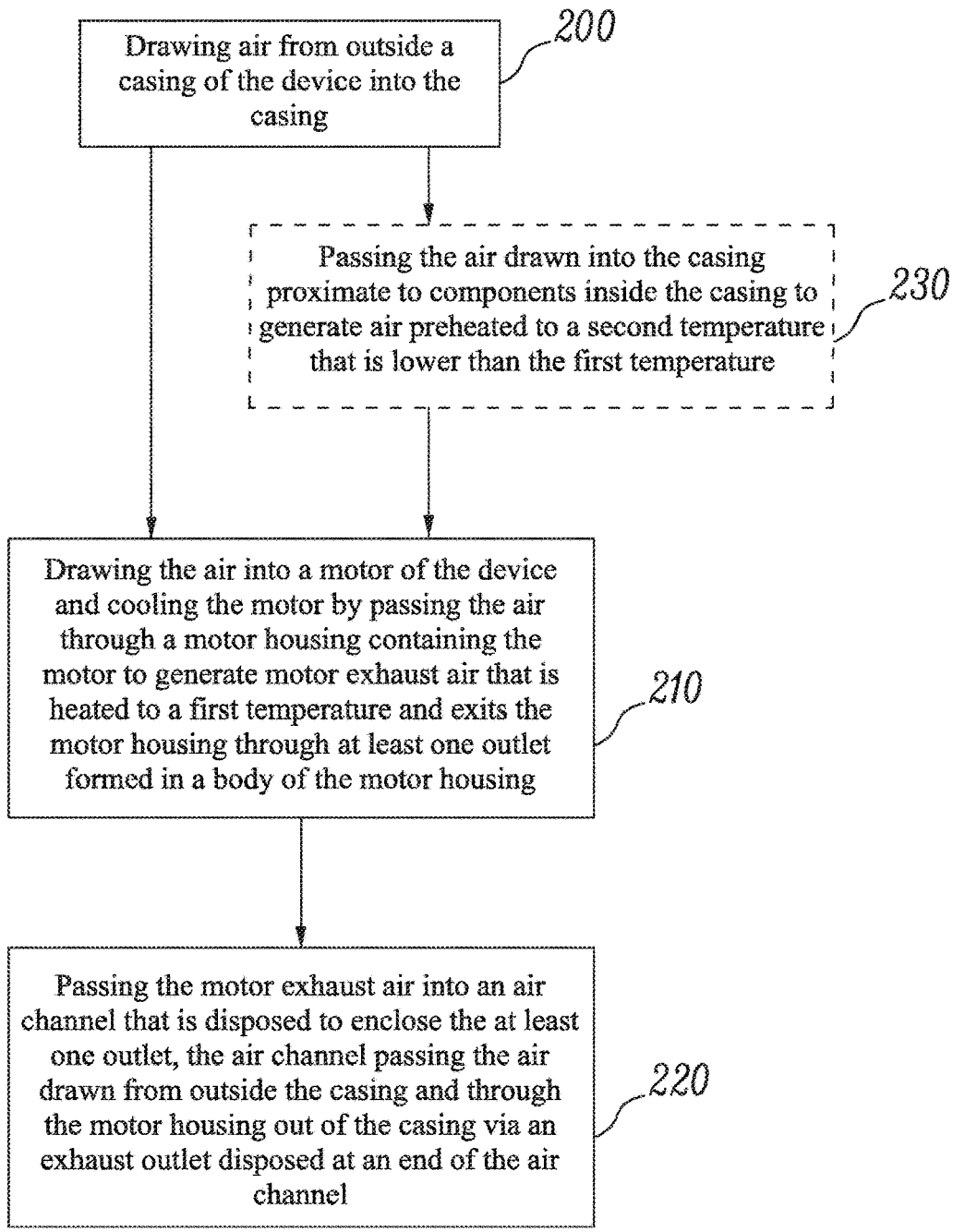

FIG. 5 illustrates a perspective view of the air channel, in which the right half portion of the casing and thereby the right half portion of the air channel is removed, to show how the air channel is disposed to enclose a portion of the motor housing according to an example embodiment; and FIG. 6 illustrates a block diagram of a method of cooling an electric power device according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an internal cooling system for an electric powered device. The internal cooling system may include an air channel that is formed to enclose a portion of a motor housing of a motor of the device. In this regard, the air channel may enclose an air outlet of the motor housing at one end of the air channel so that air that passes through the motor housing to cool the motor can be drawn from outside a casing of the device and then passed through an inside of the casing. The air may cool other internal components of the device before entering the motor housing. Then after entering the motor housing, the air will be provided into the air channel, which may direct the air out of the casing via a casing outlet disposed at an opposite end of the air channel. The air channel may form an effective path for cooling of the motor, but may also ensure that the heated air may be channeled out of the device while avoiding any recirculation of the air within other portions of the device casing. Thus, for example, if any wear products from motor brushes are entrained into the heated air, those wear products will be removed from the device and not contaminate the internal surfaces of components of the device.

Figure 1:
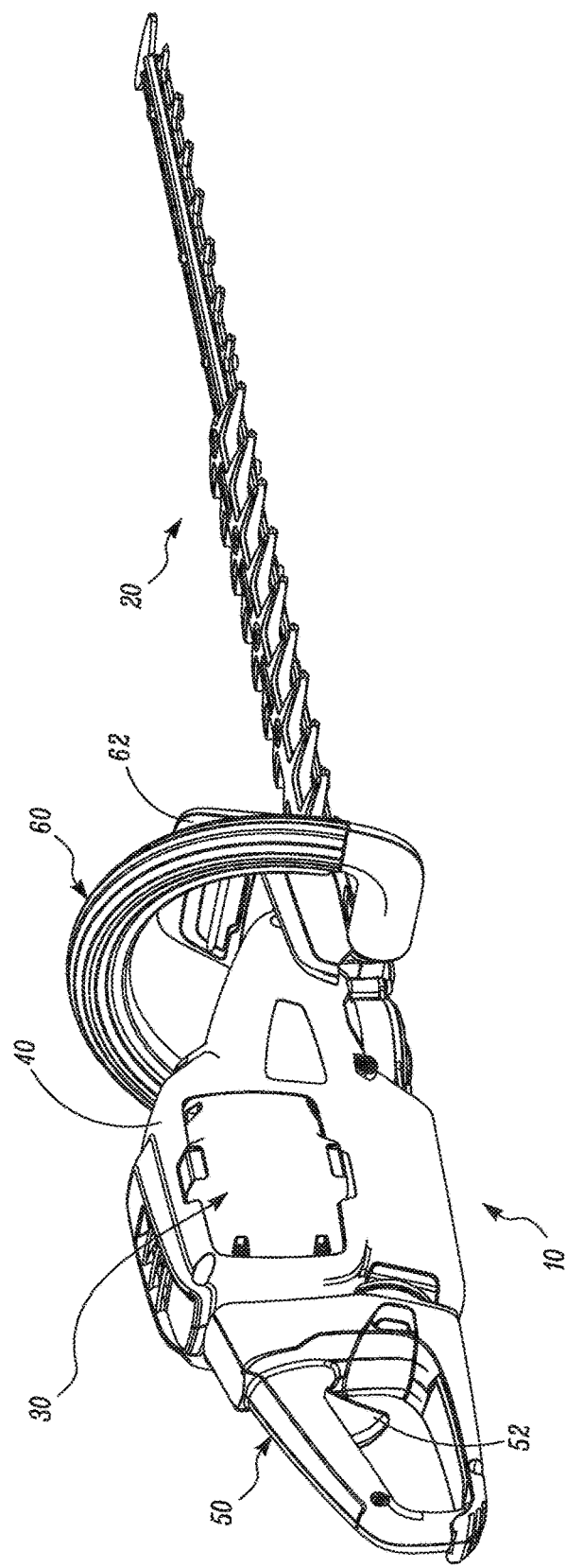
FIG. 1 illustrates a perspective view of an electric powered hedge trimmer that may be configured in accordance with an example embodiment.

Referring to the drawings, FIG. 1 shows an electric powered hedge trimmer 10 that may be configured in accordance with an example embodiment. However, it should be appreciated that the hedge trimmer 10 is merely one example of an electric powered, outdoor power device that may be configured in accordance with an example embodiment. Thus, for example, some embodiments may be practiced in connection with other outdoor power devices such as blowers, edgers, chainsaws, and/or the like. It should also be appreciated that the hedge trimmer 10 of FIG. 1 is a battery powered device. However, example embodiments could alternatively be employed in connection with corded versions of various electric powered, outdoor power devices. Thus, although an example embodiment will be described hereinafter with specific reference to the battery powered hedge trimmer 10 of FIG. 1, the applicability of alternative embodiments relative to other types of devices should be well understood.

As shown in FIG. 1, the hedge trimmer 10 may include a working implement 20, which in this example is a series of fixed and movable cutters. A motor (not shown in FIG. 1) of the hedge trimmer 10 may be used to power movable cutters of the working implement 20 so that effective cutting may be employed relative to any vegetation that is between the fixed and movable cutters. In other embodiments, the working implement 20 could be any other working component of the outdoor power device employing an example embodiment. For example, if the outdoor power device is an electric chainsaw, the working implement may be the chainsaw bar and cutting chain disposed thereon.

The motor of the hedge trimmer 10 may be powered, according to this example, by a battery pack 30. The battery pack 30 is received into a battery compartment of the hedge trimmer 10. The battery compartment is a recess or cavity formed in a casing 40 of the hedge trimmer 10. In some embodiments, the casing 40 may be formed from one or more plastic or other rigid components that may be molded to have a desired shape. The casing 40 may substantially enclose the motor, gear assemblies, control circuitry and other internal components of the hedge trimmer 10.

In an example embodiment, the hedge trimmer 10 may include a rear handle 50 and a front handle 60. An operator of the hedge trimmer 10 may use one hand to hold the front handle 60 and the other hand to hold the rear handle 50 while operating the hedge trimmer 10. In some embodiments, the rear handle 50 may include a trigger 52 or other control mechanism for engaging operation of the motor to power the working implement 20. The rear handle 50 may be attached to a rear portion of the casing 40 and the front handle 60 may be attached to a front portion of the casing 40. In some embodiments, a hand guard 62 may be disposed between the working implement 20 and a portion of the casing 40 that is proximate to the front handle 60. The hand guard 62 may provide shielding for the operator's hand relative to any debris that may be projected back toward the casing 40 during operation of the working implement 20.

Figure 2:
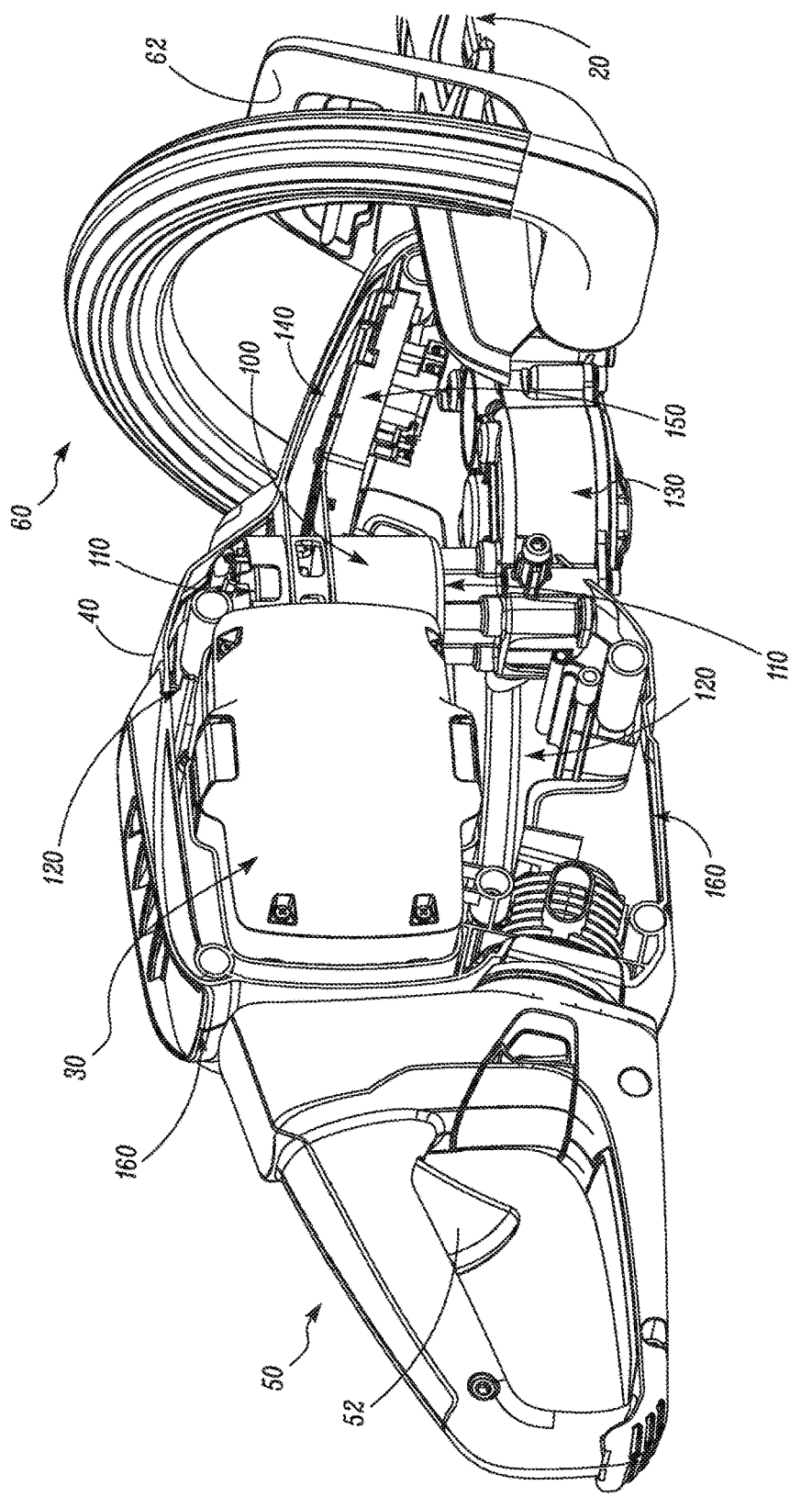
FIG. 2 illustrates a rear perspective view of the hedge trimmer with part of a casing removed to reveal some of the internal components of the hedge trimmer according to an example embodiment.
Figure 3:
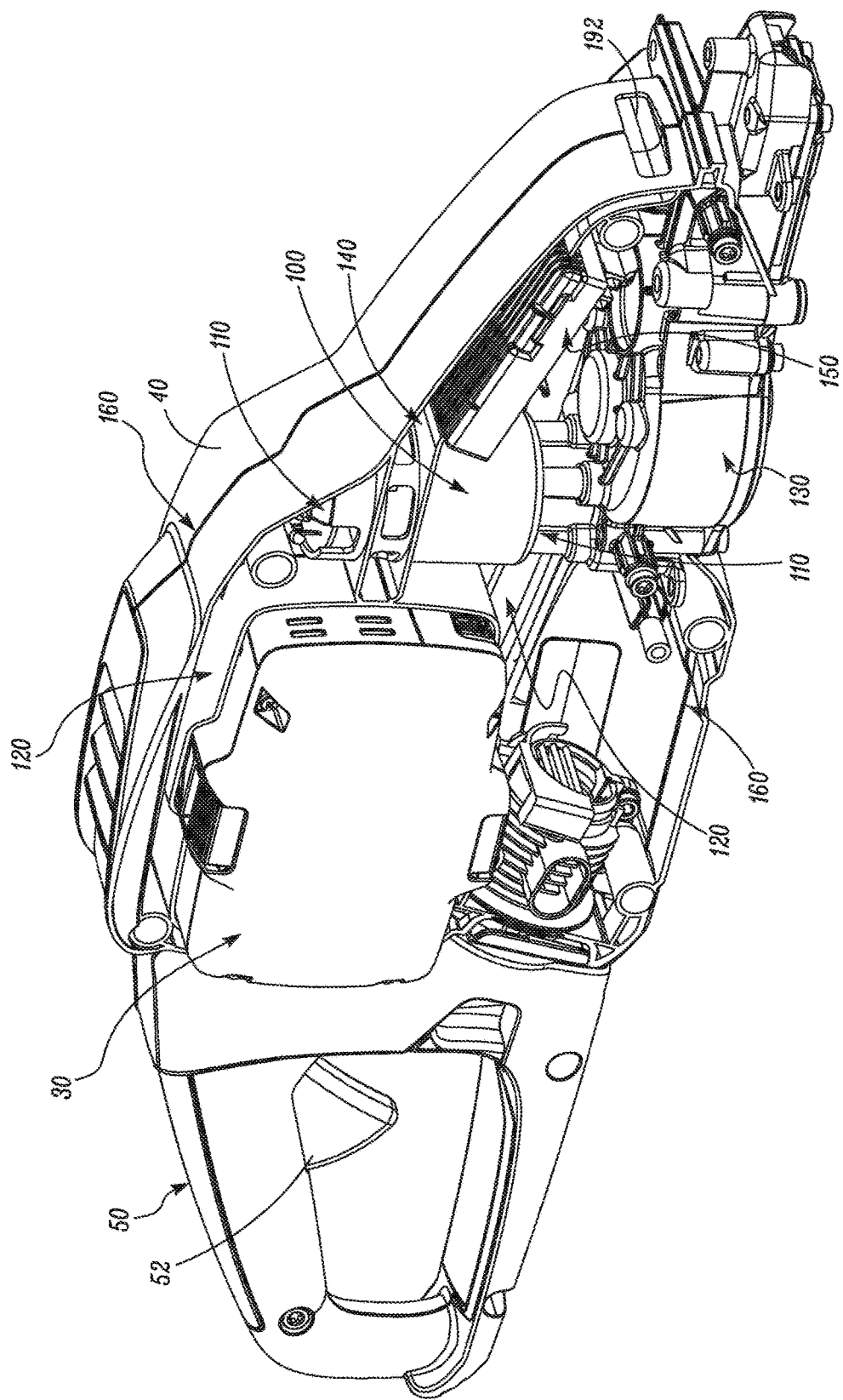
FIG. 3 illustrates a front perspective view having the same part of the casing removed as in FIG. 2 in order to provide a different perspective of the internals of the casing according to an example embodiment.

As indicated above, some example embodiments may provide for cooling of internal components of the hedge trimmer 10. FIG. 2 illustrates a rear perspective view of the hedge trimmer 10 with part of the casing 40 that is closest to the viewer removed to reveal some of the internal components of the hedge trimmer 10. FIG. 3 illustrates a front perspective view having the same part of the casing 40 removed to provide a different perspective of the internals of the casing 40. In this regard, FIGS. 2 and 3 show a motor housing 100 that houses the motor of the hedge trimmer 10. In this example, the motor may be a DC motor or a brushless DC motor (BLDC) that is powered by the battery pack 30. The motor housing 100 may enclose the motor but allow cooling air to enter into the motor housing 100 via inlet ports 110 that may be disposed at top and bottom portions of the motor housing 100, respectively. The inlet ports 110 may enable air to be drawn into the motor housing 100 from void space 120 that exists between the internal sides of the casing 40 and any internal components disposed within the casing 40. The void space 120 may extend around the battery compartment that houses the battery pack 30, around the motor housing 100, and around a gear assembly 130 that may be operably coupled to the motor and the working implement to transfer power from the motor to the working implement 20. The void space 120 may also extend external to an air channel 140 and a control unit (e.g., PCB 150) that includes processing circuitry for controlling operation of the hedge trimmer 10.

In an example embodiment, the casing 40 may be assembled by fitting molded parts together. For example, in some cases, the casing 40 may be composed of a right half portion and a left half portion that may form a majority of the casing. In such an example, a seam 160 may extend along a longitudinal centerline of the casing 40 to divide the casing 40 along the right half and left half portions. The seam 160 may include (either in discrete locations or along an entirety thereof) air gaps through which air may be drawn into internal portions of the casing 40 (i.e., into the void space 120). Additionally or alternatively, fittings with some components that have openings to the outside of the casing 40 or are otherwise coupled to the casing 40 in some manner (e.g., the battery compartment, the gear assembly 130 or other components) may provide air gaps through which air may be drawn internal to the casing 40. In the context of this discussion, air gaps should be understood to correlate to relatively loose fittings between parts that are not formed into air inlets, vents or louvers, which should be understood in the context of this description to correlate to air inlets specifically formed and designed to allow air to enter into the casing without having any other function. Thus, air gaps are gaps that exist by virtue of the natural tolerances or gaps that exist between components, but are not specifically formed holes that are provided to enable air entry into the casing 40. However, it should be appreciated that in some embodiments, one or more formed air inlets may be included in the casing 40. For example, in one embodiment, an air inlet 170 (see FIG. 4) may be formed at a rear portion of the casing 40, proximate to the rear handle 50.

In embodiments that do not employ an air inlet, the air gaps between portions of the casing 40 may be sufficient to provide enough air to enter the casing 40 to permit cooling air to be drawn from outside of the casing 40 into the void space 120. The air drawn into the void space 120 may cool internal components of the hedge trimmer 10 (e.g., the motor, gear assembly 130, etc.) prior to being exhausted from the casing 40. In embodiments where the air inlet 170, or multiple such inlets are employed, the air inlets may be of a relatively small size (e.g., smaller than 4 mm²). However, in other embodiments, the air inlet 170, or multiple such inlets may have a combined size of smaller than about 15 cm².

Figure 4:
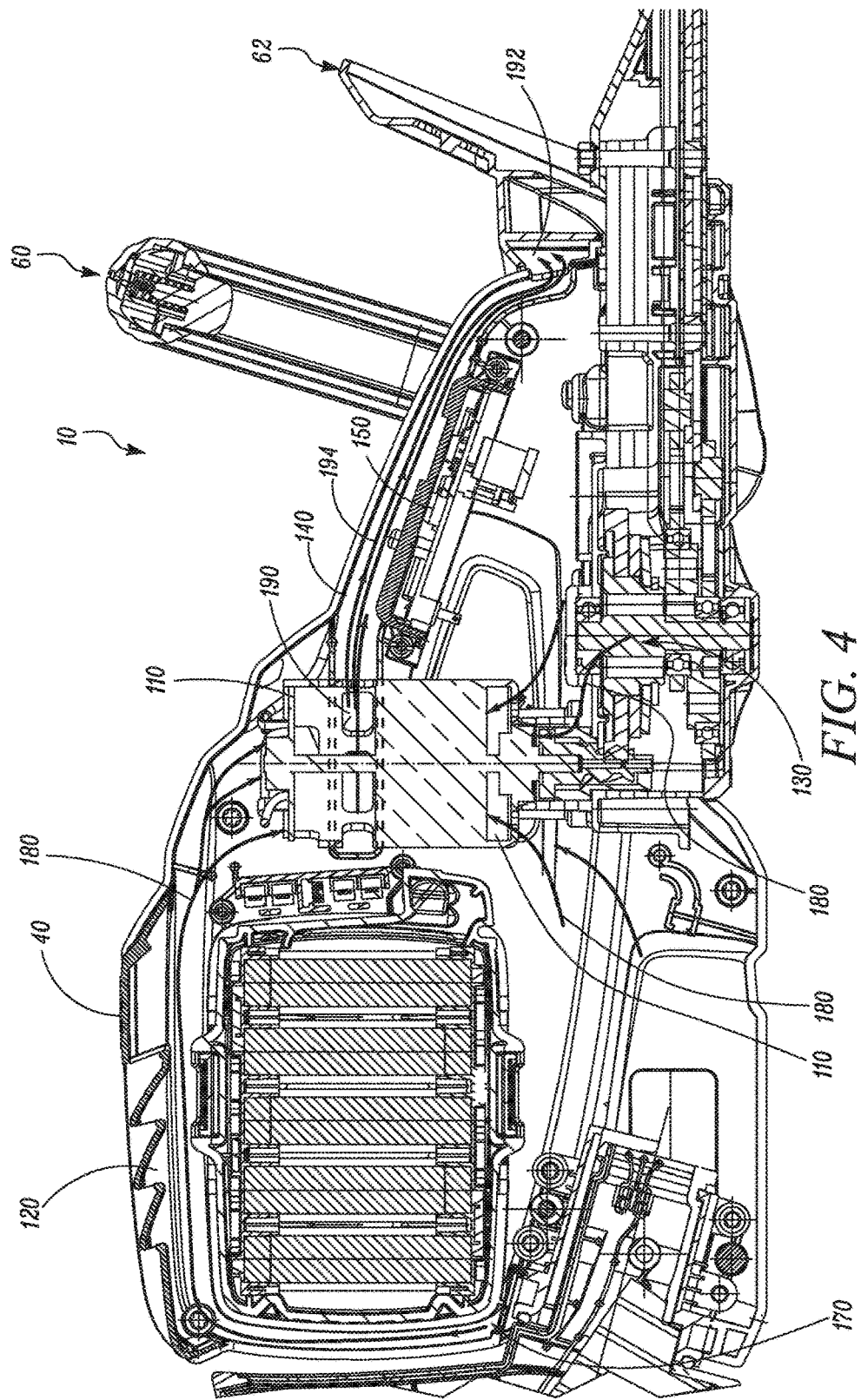
FIG. 4 illustrates a cross-section view of the power device with the right half portion of the casing removed according to an example embodiment.

FIG. 4 illustrates a cross-section view of the hedge trimmer 10 with the right half portion of the casing 40 removed. As shown in FIG. 4, air drawn into the inside of the casing 40 may be initially drawn into the void space 120. Arrows 180 illustrate some of the flow paths that the air within the void space 120 may take while being circulated inside the casing 40 and cooling various components therein. Thus, components such as the gear assembly 130, and the battery pack 30 may be cooled by movement of air within the casing 40. Movement of air within the casing 40 may be driven, at least in part, by the motor. In this regard, movement of the rotor of the motor (e.g., a DC motor in this example) may cause air to be drawn out of the void space 120 and into the inlet ports 110 of the motor housing 100 to cool the motor inside the motor housing 100. The rotor may include fins or a fan attached thereto to further facilitate initiation of air flow. However, inclusion of such fins or fan is not required.

In an example embodiment, the air channel 140 may be formed to enclose the outlet ports 190 of the motor housing 100. Of note, the air channel 140 in FIGS. 2 and 3 is shown partially cutaway in order to expose the outlet ports 190. However, it should be appreciated that all air drawn through the motor housing 100 to be expelled from the inside of the casing 40 may be passed through the outlet ports 190 and into the air channel 140. The air channel 140 may then pass the air out of the casing (and out of the air channel 140) as exhaust air. The air channel 140 may extend from a first end (e.g., a proximal end) that encloses the outlet ports 190 forward within the casing 40 to an exhaust port 192 that may be disposed proximate to the hand guard 62 at a second end (e.g., a distal end) of the air channel 140. Accordingly, the air channel 140 may be configured to pass the air drawn from outside the casing 40 and through the motor housing 100 out of the casing 40 via a casing outlet (i.e., the exhaust port 192) disposed at a distal end of the air channel 140.

The air that is drawn into the inside of the casing 40 may be at an ambient external temperature. However, as air is circulated within the casing 40 the air may be heated to an intermediate temperature by cooling various components inside the casing 40. As air is drawn from the void space 120 (at the intermediate temperature) and passed into the motor housing 100 via the inlet ports 110, the air may be heated again as the motor itself is cooled. Thus, air leaving the motor housing 100 through one or more outlet ports 190 of the motor housing 100 may be heated to a higher temperature. In some cases, the exhaust air that is ejected out of the air channel 140 through the exhaust port 192 may be at the higher temperature. However, in some embodiments, the PCB 150 may be disposed within or proximate to the air channel 140 so that air passing through the air channel 140 to be ejected therefrom (indicated by line 194 in FIG. 4) may be further heated to exhaust temperature by cooling the PCB 150 prior to leaving the air channel through the exhaust port 192. In some embodiments, the PCB 150 may form a portion of one of the walls of the air channel 140. However, in some alternative embodiments, the PCB 150 may be disposed outside of the air channel 140 and the air channel 140 may therefore be made completely by material or parts that do not form a part of another component.

In an example embodiment, the inlet ports 110 of the motor housing 100 may be disposed at the top and/or bottom of the motor housing 100. Thus, air moving through the motor housing 100 may be drawn into the motor housing 100 from two opposite directions (e.g., oriented vertically) and the one or more outlet ports 190 of the motor housing 100 may be disposed to direct air into the air channel 140 in a direction substantially perpendicular to the two opposite directions (e.g., oriented horizontally) as shown in FIG. 4. The air may thereafter move forward in the air channel 140 from the proximal end to the distal end thereof to exit the air channel 140 (and the casing 40) via the exhaust port 192. The air may be drawn from all portions of the void space 120 and consolidated in the motor housing 100 prior to being combined for exhaust through the air channel 140. This arrangement may help to ensure that all air that is preheated prior to entering the motor housing 100 and is heated in the motor housing 100 is thereafter provided directly out of the casing 40 via the air channel 140. Thus, the heated air is not allowed to recirculate inside the casing 40. This arrangement provides an efficient removal of the heated air via a duct that is dedicated to removal of the heated air. It should be noted that although the pictured example embodiment includes a single exhaust port 192 disposed proximate to the hand guard 62, multiple exhaust ports may be employed in alternative embodiments. Furthermore, although the air channel 140 extends forward along the casing 40 to terminate at a forward most end of the casing at the exhaust port 192, it should be appreciated that the air channel 140 could be arranged to extend in any desirable direction and the exhaust port 192 (or ports) would then be oriented to exhaust air from wherever the air channel 140 ends (e.g., at a side, bottom, or back of the casing 40).

In an example embodiment, an upper boundary of the air channel 140 may be formed by a portion of the casing 40 that extends from a point proximate to the motor housing 100 to the hand guard 62. Alternatively, the air channel 140 may be a separate duct provided inside the casing 40 with all of the sidewalls of the duct being formed from a single unitary piece of material (e.g., plastic, metal or composite material). However, in some cases, the air channel 140 may be formed as a duct having multiple assembled parts that have relatively air tight connections therebetween. Accordingly, in some cases, the only openings in the air channel 140 may be the outlet ports 190, which allow air to enter the air channel 140, and the exhaust port 192, which allows air to exit the air channel 140

By providing separation between air in the void space 120 that is drawn into the motor housing 100 and air in the air channel 140 that is being moved out of the exhaust port 192, example embodiments may provide for efficient heat removal while also effectively removing any contaminants that may be entrained into the air currents. For example, in embodiments in which the motor is a DC motor, the brushes may wear over time and wear products may be entrained into air streams that pass through and cool the motor. If the cooling air passed through the motor housing were allowed to reenter the void space 120 prior to exiting the casing 40, such wear products may coat, foul, or otherwise adhere to internal components (e.g., the gear assembly 130 and battery pack 30) of the hedge trimmer 10. Any dust, moisture or debris that found its way into the void space 120 may also have the opportunity to pass through the motor housing and adhere to internal components. However, by making air that is to be exhausted pass through a dedicated channel that leads to the exhaust port 192, air currents within the void space 120 may consistently tend toward the motor housing 100 and ultimately out of the casing 40 via the air channel 140. Accordingly, any dust, debris, moisture, wear products and/or the like that are entrained into the air currents that pass through the motor housing 100 can be consolidated for direct removal via the air channel 140.

FIG. 5 illustrates a perspective view of a left half portion of the air channel 140, in which the right half portion of the casing 40 and the right half portion of the channel 140 have been removed, to show how the air channel 140 is disposed to enclose a portion the motor housing 100 that is proximate to the one or more outlet ports 190. In this regard, the motor housing 100 of one example may be arranged such that at least a portion of the longitudinal length of the motor housing 100 that includes the one or more outlet ports 190 is surrounded by the air channel 140. Thus, all the air exiting the one or more outlet ports 190 enters into the air channel 140 to be moved forward and out of the casing 40 as described above. It should be appreciated that a portion of the air channel 140 that is closest to the viewer has been cut away in FIG. 5 to expose the outlet ports 190. However, these outlet ports 190 are enclosed by the air channel 140 as it wraps around the motor housing 100. As shown in FIGS. 3-5, the air channel 140 may be formed to have a width dimension that is larger than its height dimension. The length dimension of the air channel 140 (i.e., extending from the proximal end to the distal end) may be longer than both the width and height dimensions of the air channel 140. In the context used herein, the length dimension of the air channel 140 should be understood to extend along a direction of the longitudinal centerline of the casing 40. Meanwhile, the width dimension of the air channel 140 may be in the same direction as the width of the hedge trimmer (e.g., extending in a direction from one half portion of the casing 40 to the other half portion) and the height dimension of the air channel 140 may extend from a top portion of the casing 40 toward a bottom portion of the casing 40. Accordingly, as shown in FIG. 5, the longitudinal length of the motor housing 100 may be substantially perpendicular to the length dimension of the air channel 140.

Having the entire periphery of the motor housing 100 surrounded by the air channel 140 at the point along the longitudinal length of the motor housing 100 at which the one or more outlet ports 190 are located may provide a relatively simple way to ensure that the air that exits the motor housing 100 is directed into the air channel 140. However, it is not necessary that the air channel 140 surround the periphery of the motor housing 100. Instead, in some alternative embodiments, the air channel 140 may simply be formed proximate to the one or more outlet ports 190 and may not extend all the way around the periphery of the motor housing 100.

An electric power device of an example embodiment may therefore include a casing, a motor disposed within the casing, and an air channel. The motor may be configured to operate a working implement of the device and may include a motor housing having at least one outlet through which air cooling the motor exits the motor housing. The air channel may be configured to enclose the at least one outlet of the motor housing. The air channel may provide a passage for the air drawn from outside the casing and through the motor housing out of the casing via an exhaust outlet disposed in the casing at an end of the air channel.

The electric power device of some embodiments may include additional features that may be optionally added. For example, in some embodiments, (1) the casing may include a plurality of body portions, and the air may be drawn in from outside the casing exclusively through gaps between the body portions or otherwise formed in the casing. As an alternative to (1), (2) the casing may include a plurality of body portions, and the air may be drawn in from outside the casing through gaps between the body portions and through at least one air inlet provided specially for drawing in sufficient air. However, it should be appreciated that some alternative embodiments may employ one or more air inlets without relying on gaps between body portions. In some cases, (3) the at least one inlet (if used) is disposed proximate to a rear handle of the device. In some embodiments, (4) the device further includes a battery compartment configured to house a battery for powering the device and the battery compartment is disposed within the casing of the device. If the at least one inlet is provided, the at least one inlet may have a size of less than about 15 cm$^2$.

In some embodiments, any or all of (1) to (4) may be employed in addition to the optional modifications or augmentations described below. For example, in some embodiments, air passing through the motor housing and the air channel may transport motor wear products out of the casing to inhibit entry of the wear products inside the casing. Additionally or alternatively, the air channel may be disposed proximate to the control unit to enable air passed through the air channel to cool the control unit prior to exiting the air channel. In some embodiments, the casing outlet may be located proximate to a hand guard disposed between a front handle and the working implement (which may include at least one cutting blade). In an example embodiment, the motor is a DC or a brushless DC motor having a fan to facilitate movement of air into the cooling channel. In an example embodiment, air being drawn into the motor housing is preheated by other device components within the casing of the device prior to entering into the motor housing. For example, air drawn into the motor housing may be preheated by cooling a battery or gear assembly of the device. In some embodiments, air is drawn into the motor housing from two opposite directions and the at least one outlet of the motor housing is disposed to direct air into the air channel in a direction substantially perpendicular to the two opposite directions.

In an example embodiment, a method of cooling an electric power device is provided as shown in the block diagram of FIG. 6. The method may include drawing air from outside a casing of the device into the casing at operation 200 and drawing the air into a motor of the device and cooling the motor by passing the air through a motor housing containing the motor to generate motor exhaust air that is heated to a first temperature (e.g., the higher temperature mentioned above) and exits the motor housing through at least one outlet formed in a body of the motor housing at operation 210. The method may further include passing the motor exhaust air into an air channel that is disposed to enclose the at least one outlet at operation 220. The air channel may provide a passage for the air drawn from outside the casing and through the motor housing out of the casing via an exhaust outlet disposed at an end of the air channel.

In some cases, the method described above may be augmented or modified according to any or all of the options described below in any combination. For example, in some embodiments, the method may further include passing the air drawn into the casing proximate to components inside the casing to generate air preheated to a second temperature (e.g., the intermediate temperature mentioned above) that is lower than the first temperature at operation 230. In an example embodiment, passing the motor exhaust air into the air channel may further include passing the motor exhaust air proximate to the control unit to generate air heated to a third temperature (e.g., the exhaust temperature mentioned above) that is higher than the first temperature. In some example embodiments, drawing air from outside the casing of the device comprises drawing the air into the casing through an inlet disposed proximate to a rear handle of the device. Alternatively, drawing air from outside the casing of the device may include drawing the air exclusively through gaps between body portions of the casing or otherwise formed in the casing. In some cases, drawing the air into the motor may include drawing the air into the motor housing from two opposite directions, and the at least one outlet of the motor housing may be disposed to direct air into the air channel in a direction substantially perpendicular to the two opposite directions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An electric power device comprising:
   a casing;
   a motor disposed within the casing, the motor being configured to operate a working implement of the device and including a motor housing having at least one outlet through which air cooling the motor exits the motor housing, the air drawn from outside the casing, into the motor housing, and passing through the motor housing to the at least one outlet;
   an air channel enclosing the at least one outlet of the motor housing, the air channel providing an enclosed passage for passing all the air exiting the motor housing out of the casing via an exhaust port disposed in the casing at an end of the air channel, said air channel being arranged to ensure that the air is channeled out of the electric power device while avoiding any recirculation of the air within other portions of the device inside the casing; and
   a control unit positioned within the air channel and configured to provide control over operation of the electric power device, wherein the air passing through the air channel cools the control unit prior to exiting the air channel.

2. The device of claim 1, further comprising a battery compartment configured to house a battery for powering the device, the battery compartment being disposed within the casing of the device.

3. The device of claim 2, wherein the air drawn into the motor housing is preheated by cooling the battery of the device.

4. The device of claim 1, wherein the casing comprises a plurality of body portions, and wherein the air is drawn from outside the casing exclusively through gaps between the body portions or otherwise formed in the casing.

5. The device of claim 1, wherein the casing comprises a plurality of body portions, and wherein the air is drawn from outside the casing through gaps between the body portions and through at least one air inlet provided specially for drawing in sufficient air.

6. The device of claim 1, wherein the air is drawn from outside the casing through at least one air inlet provided specially for drawing in sufficient air.

7. The device of claim 6, wherein the at least one air inlet is less than about 15 cm$^2$ in size.

8. The device of claim 1, wherein air passing through the motor housing and the air channel transports motor wear products out of the casing to inhibit entry of the wear products inside the casing.

9. The device of claim 1, wherein the air channel is arranged to extend in a direction and the exhaust port is oriented to exhaust heated air in the direction the air channel ends, wherein said air channel ends at a side, bottom, or back of the casing.

10. The device of claim 1, wherein the working implement includes at least one cutting blade.

11. The device of claim 1, wherein the device is a hedge trimmer or a handheld device.

12. The device of claim 1, wherein the motor is a DC or a brushless DC motor having a fan to facilitate movement of the air into the air channel.

13. The device of claim 1, wherein the air drawn into the motor housing is preheated by cooling a gear assembly of the device.

14. The device of claim 1, wherein the air is drawn into the motor housing from two opposite directions and wherein the at least one outlet of the motor housing is disposed to direct the air into the air channel in a direction substantially perpendicular to the two opposite directions.

15. A method of cooling an electric power device comprising:
    drawing air from outside a casing of the device into the casing;
    drawing the air into a motor of the device;
    cooling the motor by passing the air through a motor housing containing the motor through at least one outlet formed in a body of the motor housing; and
    passing all the air exiting the at least one outlet into an air channel that encloses the at least one outlet out of the casing via an exhaust port disposed at an end of the air channel, wherein a control unit is positioned in the air channel and the air passing through the air channel cools the control unit prior to exiting the air channel.

16. The method of claim 15, further comprising passing the air drawn into the casing proximate to components inside the casing before the air enters the motor.

17. The method of claim 15, wherein:
drawing air from outside the casing of the device comprises drawing the air into the casing through an inlet disposed proximate to a rear handle of the device; or
drawing air from outside the casing of the device comprises drawing the air into the casing exclusively through gaps between body portions of the casing or otherwise formed in the casing; or
drawing the air into the motor comprises drawing the air into the motor housing from two opposite directions, wherein the at least one outlet of the motor housing is disposed to direct the air into the air channel in a direction substantially perpendicular to the two opposite directions.

18. An electric power device comprising:
a casing comprising a plurality of body portions;
a motor disposed within the casing, the motor being configured to operate a working implement of the electric power device and including a motor housing having at least one outlet through which air cooling the motor exits the motor housing, the air drawn from outside the casing exclusively through gaps between the body portions into the motor housing and passing through the motor housing via an outlet in the motor housing; and
an air channel enclosing the outlet of the motor housing, the air channel providing a passage for passing the air exiting the motor housing out of the casing via an exhaust outlet at an end of the air channel, the exhaust outlet being disposed in an exterior surface of the casing proximate a hand guard of the electric power device, the hand guard being disposed between the working implement and a handle of the electric power device,
wherein the air channel channels the air out of the electric power device without circulating the air within other portions of the casing.

* * * * *